United States Patent
Park

(10) Patent No.: US 10,086,764 B2
(45) Date of Patent: Oct. 2, 2018

(54) APPARATUS AND METHOD FOR CONTROLLING A VIEWING ANGLE FOR A VEHICLE, AND A VEHICLE INCLUDING THE APPARATUS

(71) Applicant: HYUNDAI MOTOR COMPANY, Seoul (KR)

(72) Inventor: Hyungsoon Park, Seoul (KR)

(73) Assignee: HYUNDAI MOTOR COMPANY (KR)

( * ) Notice: Subject to any disclaimer, the term of this patent is extended or adjusted under 35 U.S.C. 154(b) by 107 days.

(21) Appl. No.: 15/082,194

(22) Filed: Mar. 28, 2016

(65) Prior Publication Data
US 2017/0101058 A1    Apr. 13, 2017

(30) Foreign Application Priority Data
Oct. 12, 2015  (KR) ......................... 10-2015-0142401

(51) Int. Cl.
*B60R 1/02*     (2006.01)
*B60R 1/08*     (2006.01)
*B60R 1/072*    (2006.01)

(52) U.S. Cl.
CPC .............. *B60R 1/081* (2013.01); *B60R 1/072* (2013.01); *B60R 2300/101* (2013.01); *B60R 2300/105* (2013.01); *B60R 2300/8026* (2013.01)

(58) Field of Classification Search
USPC ............................................. 701/49, 36, 301
See application file for complete search history.

(56) References Cited

U.S. PATENT DOCUMENTS 5,798,575 A *   8/1998   O'Farrell .................. B60R 1/00
                                                  307/10.1
6,621,062 B1 *  9/2003   Tamagawa .............. B60R 1/025
                                                   250/206
(Continued)

FOREIGN PATENT DOCUMENTS

KR       1998-030276         7/1998
KR    10-2005-0101726 A     10/2005
(Continued)

OTHER PUBLICATIONS

Korean Office Action dated Jul. 18, 2016 for Korean Patent Application No. 10-2015-0142401, 11 pages.

*Primary Examiner* — Richard A Goldman
(74) *Attorney, Agent, or Firm* — Brinks Gilson & Lione

(57) ABSTRACT

Apparatus and methods for controlling a viewing angle for a vehicle, and a vehicle including the apparatus, are disclosed which may easily determine movements of a following vehicle and increase driving convenience and stability without the need for the driver to look back, by controlling the angle of a side mirror or side camera according to a situation of the vehicle. The apparatus includes an information receiver configured to receive information about a situation of a vehicle, information about a driving direction of the vehicle, and lane information of the vehicle; a motor controller configured to control an angle of a side mirror or side camera that captures a side and rear view of the vehicle; and a viewing angle controller configured to determine whether it is a situation to change the angle of the side mirror or side camera based on the situational information collected by the information receiver, and to then determine an angle between the driving direction of the vehicle, the information (Continued)

of which is received by the information receiver, and a lane, and to control the motor controller based on the determination results.

14 Claims, 16 Drawing Sheets

(56) References Cited

U.S. PATENT DOCUMENTS

| | | | | |
|---|---|---|---|---|
| 6,927,677 | B2* | 8/2005 | Anderson | B60Q 1/2665 280/727 |
| 7,012,510 | B2* | 3/2006 | Su | B60R 1/00 340/435 |
| 8,364,352 | B2* | 1/2013 | Mimura | B60R 11/0229 348/148 |
| 8,775,031 | B1* | 7/2014 | Bankhead | B60R 1/025 359/843 |
| 8,783,920 | B1 | 7/2014 | Mohktari Sharghi | |
| 8,926,105 | B2* | 1/2015 | Verheyden | B60R 1/0607 348/148 |
| 2003/0191569 | A1* | 10/2003 | Su | B60R 1/07 701/49 |
| 2006/0095168 | A1* | 5/2006 | Chahl | G05D 1/0808 701/13 |
| 2006/0155444 | A1* | 7/2006 | Lee | B60R 1/025 701/49 |
| 2008/0243390 | A1* | 10/2008 | Nakamori | G06K 9/00805 701/301 |
| 2010/0220406 | A1 | 9/2010 | Cuddihy et al. | |
| 2012/0022749 | A1* | 1/2012 | Clegg | B60R 1/025 701/49 |
| 2014/0142809 | A1* | 5/2014 | Schofield | B60Q 1/1423 701/36 |
| 2015/0210233 | A1* | 7/2015 | Weksler | B60R 16/037 701/49 |
| 2015/0239398 | A1* | 8/2015 | Kaplan | B60R 1/006 701/49 |
| 2016/0101749 | A1* | 4/2016 | Wu | B60R 16/037 701/49 |

FOREIGN PATENT DOCUMENTS

| | | |
|---|---|---|
| KR | 20-0400882 B1 | 11/2005 |
| KR | 10-2013-0039000 A | 4/2013 |
| KR | 10-2013-0111678 A | 10/2013 |
| KR | 10-1481229 | 5/2014 |

* cited by examiner

APPARATUS AND METHOD FOR CONTROLLING A VIEWING ANGLE FOR A VEHICLE, AND A VEHICLE INCLUDING THE APPARATUS

CROSS-REFERENCE TO RELATED APPLICATION(S)

The present application claims the benefit under 35 U.S.C. § 119(a) of a Korean Patent Application Serial No. 10-2015-0142401, filed on Oct. 12, 2015 in the Korean Intellectual Property Office, the entire disclosure of which is hereby incorporated by reference.

BACKGROUND

1. Field

The present disclosure relates to an apparatus and method for controlling a viewing angle for a vehicle, and a vehicle including the apparatus.

2. Description of the Related Art

Side mirrors are mounted on either side of the vehicle. The side mirrors are for securing rear views for the driver behind the wheels, and are fixed by the driver setting and manipulating the angle based on the position where the side mirrors are mounted or driving habits of the driver.

However, since the angle of the side mirror is basically set based on an occasion when the vehicle is moving forward, it is difficult to secure the rear view with the side mirror when the car is driven in reverse or changing lanes.

Many approaches to solve the problem of not securing the rear view have been suggested.

For example, there is an approach to provide a convex lens as an auxiliary mirror that is additionally attached onto a part of the side mirror. The convex lens serves to further secure the rear view. However, it cannot be said that the convex lens secures substantially sufficient rear view because, by the nature of the convex lens, an object in the rear view seems smaller than it is. Moreover, the structure in which the convex lens is overlaid on the side mirror narrows the field of rear view that may be seen through the side mirror. This means that an area of the rear view seen through the side mirror becomes smaller as much as an area occupied by the convex lens.

In another example, an apparatus for adjusting the angle of side mirrors by manipulation of the driver has been suggested. However, the apparatus may secure the rear view by the driver adjusting the left/right side mirrors using a cluster input unit, but it takes a long time to do the adjustment and the angle is adjusted without regard to the direction at which the driver stares and the driving status of the vehicle.

SUMMARY

To address the aforementioned problem, the present disclosure provides an apparatus and method for controlling viewing angles for a vehicle, and a vehicle including the apparatus, which may easily determine movements of a following vehicle and increase driving convenience and stability without the need for the driver to look back, by controlling the angle of a side mirror or side camera according to a situation of the vehicle.

In accordance with an aspect of the present disclosure, an apparatus for controlling viewing angle is provided. The apparatus includes an information receiver for receiving information about a situation of a vehicle, information about a driving direction of the vehicle, and lane information of the vehicle; a motor controller for controlling an angle of a side mirror or side camera that captures a side and rear view of the vehicle; and a viewing angle controller for determining whether it is a situation to change the angle of the side mirror or side camera based on the situational information collected by the information receiver, then determining an angle between the driving direction of the vehicle, the information of which is received by the information receiver, and a lane, and controlling the motor controller based on the determination results.

The viewing angle controller may determine a distance from a current location of the vehicle to a lane into which the vehicle is going to enter, based on the situational information received by the information receiver.

The viewing angle controller may re-control the angle of the side mirror or side camera, if the lane information captured by an image capturer and the driving direction of the vehicle, the information of which is collected by the information collector, correspond to a lane.

In accordance with another aspect of the present disclosure, a vehicle is provided. The vehicle includes an information collector for collecting information about a situation of the vehicle and information about a driving direction of the vehicle; an image capturer mounted on the front of the vehicle for extracting lane information of the vehicle; and an apparatus for controlling viewing angle for determining whether it is a situation to change an angle of a side mirror or side camera based on situational information collected by the information collector, then determining an angle between the driving direction of the vehicle, the information of which is collected by the information collector, and a lane extracted by the image capturer, and controlling the angle of the side mirror based on the determination results.

The viewing angle controller may determine a distance from a current location of the vehicle to a lane into which the vehicle is going to enter, based on the situational information collected by the information collector.

The viewing angle controller may determine the angle between the driving direction of the vehicle and the lane, based on the distance.

The viewing angle controller may re-control the angle of the side mirror, if the lane information captured by the image capturer and the driving direction of the vehicle, the information of which is collected by the information collector corresponds to a lane.

The information collector may include at least one of a Global Positioning System (GPS) module, a navigation system, a gear level of the vehicle, a speed detector of the vehicle, a Blind Spot Detection (BSD) detector, and an indicator light detector.

The vehicle may further include an output to indicate to the driver that the angle of the side mirror has been changed.

The output unit may include at least one of an image display, a vibrator, and a sounding unit.

In accordance with another aspect of the present disclosure, a vehicle is provided. The vehicle includes a side camera for capturing an area behind and to a side of the vehicle; an information collector for collecting information about a situation of the vehicle and information about a driving direction of the vehicle; an image capturer mounted on the front of the vehicle for extracting lane information of the vehicle; and an apparatus for controlling viewing angle for determining whether it is a situation to change an angle of the side camera based on situational information collected by the information collector, then determining an angle between the driving direction of the vehicle, the information of which is collected by the information collector, and a lane extracted by the image capturer, and controlling the angle of the side camera based on the determination results.

The viewing angle controller may determine a distance from a current location of the vehicle to a lane into which the vehicle is going to enter, based on the situational information collected by the information collector.

The viewing angle controller may determine the angle between the driving direction of the vehicle and the lane, based on the distance.

The viewing angle controller may re-control the angle of the side camera, if the lane information captured by the image capturer and the driving direction of the vehicle, the information of which is collected by the information collector corresponds to a lane.

The information collector may include at least one of a Global Positioning System (GPS) module, a navigation system, a gear level of the vehicle, a speed detector of the vehicle, a Blind Spot Detection (BSD) detector, and an indicator light detector.

The vehicle may further include an output unit for informing a driver that the angle of the side mirror has been changed.

The output unit may include at least one of an image display, a vibrator, and a sounding unit.

In accordance with another aspect of the present disclosure, a method for controlling viewing angle for vehicle is provided. The method includes collecting information about a situation of a vehicle and information about a driving direction of the vehicle; extracting lane information of the vehicle; determining whether it is a situation to change an angle of a side mirror or side camera based on the collected situational information; determining an angle between the collected driving direction of the vehicle and the extracted lane; and controlling an angle of the side mirror or side camera based on the determination results.

Determining an angle between the collected driving direction of the vehicle and the extracted lane may include determining a distance from a location of the vehicle to a lane into which the vehicle is going to enter based on the situational information.

Determining a distance from a location of the vehicle to a lane into which the vehicle is going to enter based on the situational information may include determining an angle between the driving direction of the vehicle and the lane, based on the distance.

Controlling an angle of the side mirror or side camera based on the determination results may include re-controlling the angle of the side mirror or side camera, if the captured lane and the collected driving direction of the vehicle correspond to a lane.

Controlling an angle of the side mirror or side camera based on the determination results may include informing a driver that the angle of the side mirror or side camera has been changed.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other features and advantages of the present disclosure will become more apparent by describing in detail exemplary embodiments thereof with reference to the attached drawings in which.

Throughout the drawings, like reference numerals will be understood to refer to like parts, components, and structures.

DETAILED DESCRIPTION

Forms of an apparatus and method for controlling viewing angle for vehicle, and vehicle including the apparatus will now be described in detail with reference to accompanying drawings.

Figure 1:
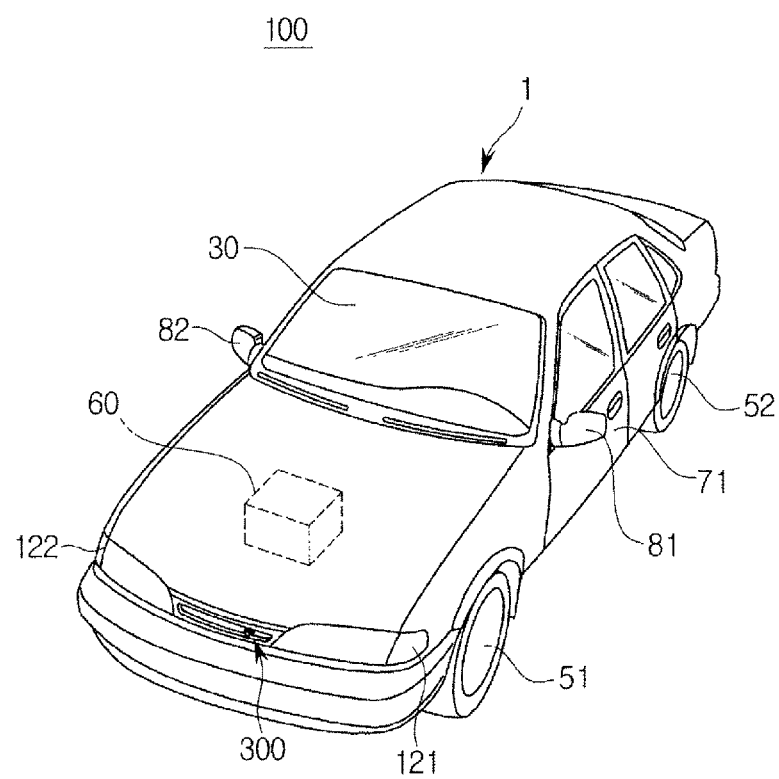
FIG. 1 is an exterior view of a vehicle.

FIG. 1 is an exterior view of a vehicle.

In FIG. 1, a vehicle 100 includes a main body 1 that constitutes the exterior of the vehicle 100, wheels 51 and 52 for moving the vehicle 100, a driving system 60 for turning the wheels 51 and 52, doors 71 for shielding the interior of the vehicle 100 from the outside, a front window 30 through which the driver can see a view ahead of the vehicle 100, side mirrors 81 and 82 for helping the driver see areas behind and to the sides of the vehicle 100, an image capturer 300 mounted on the front of the vehicle 100 for extracting lane information of the vehicle 100, and indicator lights 121 and 122 for indicating or warning the other cars of which direction the vehicle 100 will be driven in.

The wheels 51 and 52 include front wheels 51 and rear wheels 52, and the driving system 60 transmits turning forces to the front wheels 51 or rear wheels 52 to move the vehicle 10 forward or backward. The driving system 60 may employ a motor that produces the turning force from electrical power supplied from a storage battery (not shown) or a combustion engine (not shown) that burns a fuel to create the turning force.

The doors 71 and 72 are attached onto the left and right sides of the main body 1, and opened for a person to enter and exit the vehicle 100 and closed for shielding the interior of the vehicle 10 from the outside.

The wind screen (or windshield glass) 30 is mounted on the upper front of the vehicle 100 for securing a field of view ahead of the vehicle 100 for the driver in the vehicle 100.

The image capturer 300 may be mounted on the front of the main body 1 or on the lower front of the vehicle 100. Besides, the image capturer 300 may be mounted on any location as long as the location allows the image capturer 300 to capture lanes on the road in order to obtain lane information in the driving direction of the vehicle 100.

The side mirrors 81 and 82 include a left side mirror 81 and a right side mirror 82 attached onto the left and right sides of the main body 1, respectively, for helping the driver see views behind and to the sides of the vehicle 100.

The indicator lights 121, 122 include left and right indicator lights 121, 122 located on front and rear sides of the vehicle 100. The indicator lights 121, 122 may flicker by manipulation of a gear lever 41, and may be turned off by manipulation of a steering wheel of the vehicle 100.

Figure 6:
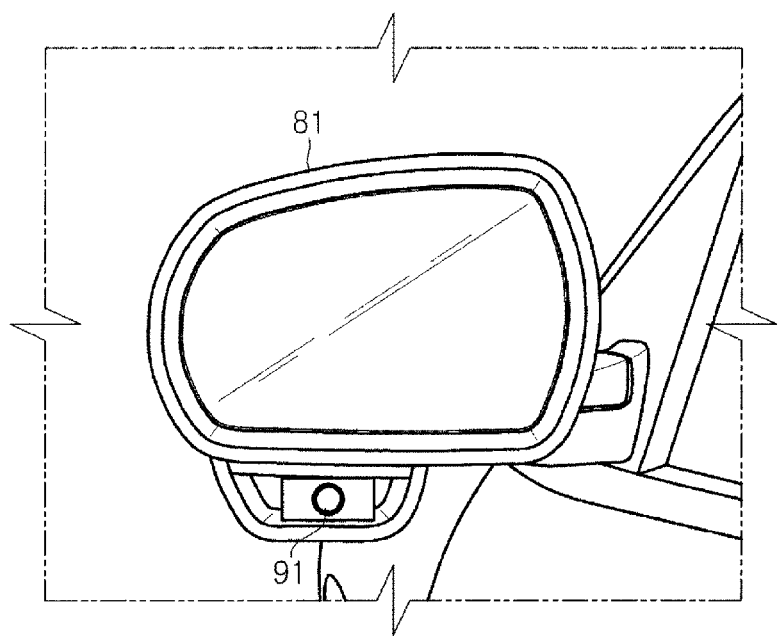
FIG. 6 shows a side mirror equipped with a side camera, which is mounted on a vehicle.
Figure 7:
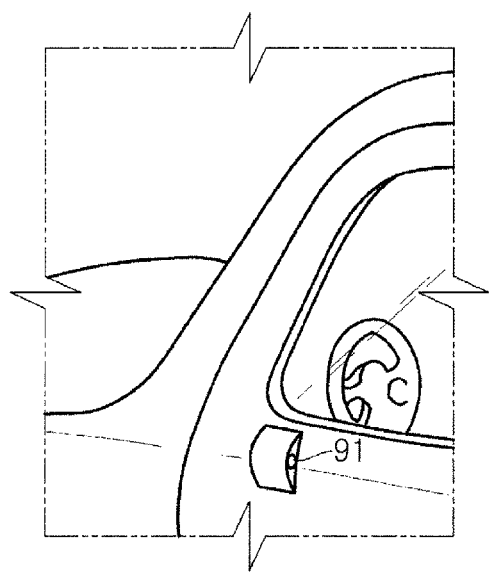
FIG. 7 shows a vehicle equipped with a side camera.

In addition to what are shown in FIG. 1, the vehicle 100 may include side cameras 91, 92 as shown in FIG. 7 for obtaining information about side and rear views of the vehicle 100 for the driver. The side cameras 91, 92 may be installed on the left and right sides of the main body 1. Furthermore, the side cameras 91, 92 may be provided together with the side mirrors 81, 82 (see FIG. 6).

Although not shown in FIG. 1, the vehicle 100 may include sensing devices, such as Blind Spot Detection (BSD) sensors for detecting obstacles or other vehicles behind the vehicle 100, a rain sensor for detecting whether it rains and an amount of rainfall, etc.

For example, the BSD sensor may send out a detection signal from the side or from the rear side of the vehicle 100 and receive a reflection signal reflected from an obstruction or another vehicle. Based on the waveform of the received reflection signal, the vehicle 100 may determine whether there is another vehicle or obstruction behind the vehicle 100 and where the vehicle or obstruction is. The BSD sensor may employ a scheme of detecting a distance to the other car or obstruction by sending out ultrasounds and receiving the reflected ultrasounds from the car or obstruction.

Figure 2:
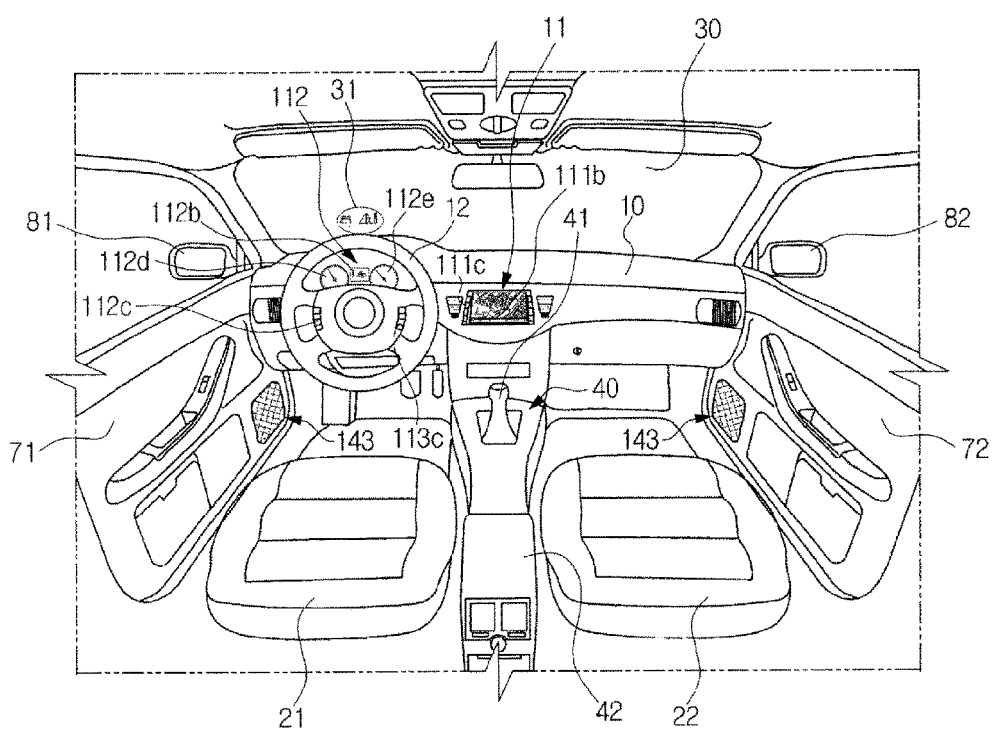
FIG. 2 is an interior view of a vehicle.
Figure 3:
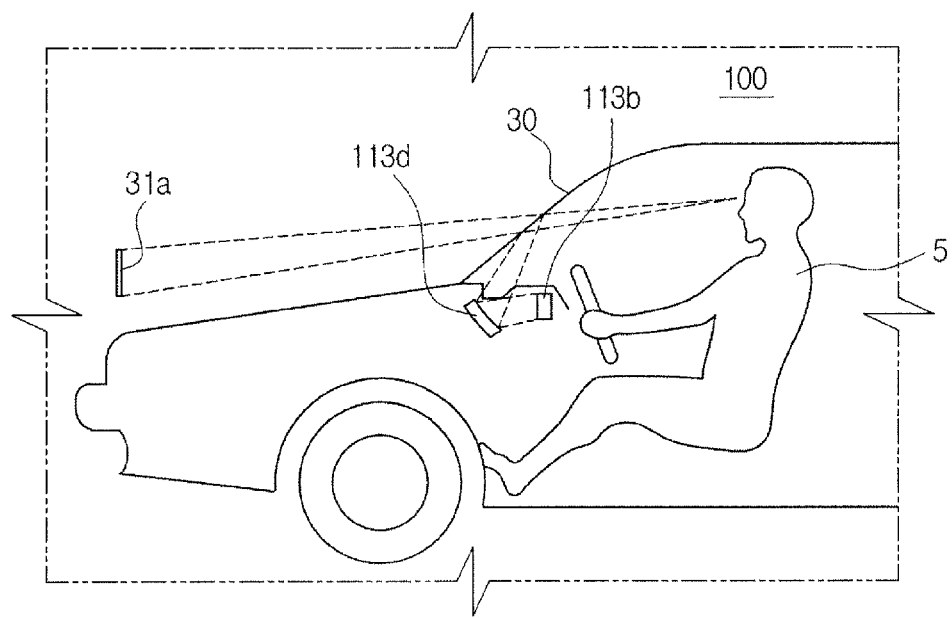
FIG. 3 shows a structure of a Head Up Display (HUD) module of a vehicle.

FIG. 2 is an interior view of a vehicle and FIG. 3 shows a structure of a Head Up Display (HUD) module of a vehicle.

Referring to FIG. 2, an Audio, Video, and Navigation (AVN) display 111*b* may be mounted on a center fascia 11 of a front dashboard 10 of the vehicle 100 for the user, especially, the driver behind the wheel to see or manipulate an image displayed on the AVN display 111*b*. The center fascia 11 refers to a center area of the dash board 10 having a control panel board located between a driver seat 21 and a passenger seat 22.

The AVN display 111*b* may be implemented with Liquid Crystal Displays (LCDs), Light Emitting Diodes (LEDs), Plasma Display Panels (PDPs), Organic Light Emitting Diodes (OLEDs), Cathode Ray Tubes (CRTs), or the like.

An AVN input unit 111*c* may be implemented with hard keys located in an area adjacent to the AVN display 111*b*, as shown in FIG. 2. Alternatively, if the AVN display 111*b* is implemented as a touch screen, it is possible for the AVN input unit 111*c* to be implemented as soft keys in an area on the AVN display 111*b*.

In some forms of the present disclosure, the AVN display 111*b* may be provided with signals from an image display 610, and may output an alert screen to indicate that the angle of the side mirror 81, 82 or side camera 91, 92 has been changed.

A cluster 112 may be placed in an area on the dashboard 10 that faces a steering wheel 12 for the driver to check the instrument panel while driving, and a cluster display 112*b* may also be implemented with an LCD, LEDs, a PDP, OLEDs, a CRT, etc.

The cluster 112 may include not only the cluster display 112*b* but also a speed gauge 112*d* indicating a speed of the vehicle 100, an RPM gauge 112*e* indicating an RPM of the vehicle 100, and a fuel gauge 112*f* indicating an amount of remaining fuel of the vehicle 100, and the cluster display 112*b* may be placed between the speed gauge 112*d* and the RPM gauge 112*e*, as shown in FIG. 2. This is only by way of example, and there are no limitations on where to place the cluster display 112*b* in embodiments of the present disclosure.

Furthermore, the cluster display 112*b* may receive signals from an image display 610, and may output an alert screen indicating that the angle of the side mirror 81, 82 or side camera 91, 92 has been changed.

The cluster input unit 112*c* may be formed with hard keys on a part of the steering wheel 12 in order for the driver to manipulate them while holding the steering wheel 12. Alternatively, the cluster input unit 112*c* may be formed of a lever in the back of the steering wheel 12 for the driver to manipulate, e.g., push it forward, pull it backward, push it up or down, to control the cluster 112.

A HUD module is a device that enables visual information to be provided to the driver to appear on the front glass 30 of the vehicle 100. The front glass 30 is also referred to as a windshield glass. Descriptions of how images output from the HUD module are presented on a display area 31 of the front glass 30 as well as configuration and operation of the HUD module will now be provided in detail in connection with FIG. 3.

Referring to FIG. 3, an HUD 113*b* may be placed at a front area of the vehicle 100, and a reflector 113*d* may be placed in front of the HUD 113*b*. When the HUD 113*b* outputs an image forward, the image is projected on the front glass 30 by being reflected by the reflector 113*d*. In this case, the front glass 30 serves as a combiner.

The projected image is seen by the driver 5 by being reflected off the front glass 30, and as shown in FIG. 2, the driver 5 may look at the image in the display area 31 on the front glass 30, but the image is actually a virtual image 31*a* formed on the outside of the front glass 30.

In some forms, the HUD module may receive a signal from the image display 610. When the HUD 113*b* outputs an image forward that is required for warning, the image may be projected on the front glass 30 by being reflected by the reflector 113*d*.

In other forms, the HUD module may receive an image output from the image display 610. When the HUD 113*b* outputs an image forward, the image may be projected on the front glass 30 by being reflected by the reflector 113*d*.

The configuration of the HUD module shown in FIG. 3 is only by way of example, and it is also possible for the HUD module to include more than one reflectors 113*d*, omit the reflector 113*d*, or additionally include a grating device.

The projected image may have various forms without limitations. In some forms, the HUD module may receive a signal and data sent from the image display 610, and display an image corresponding to the signal, or the data sent from the image display 610 on the screen.

Turning back to FIG. 2, similar to the cluster input unit 112c, the HUD input unit 113c may also be formed as hard keys on a part of the steering wheel 12 in order for the driver 5 to manipulate them while holding the steering wheel 12. Alternatively, the HUD input unit 112c may be formed in the form of a lever in the back of the steering wheel 12 for the driver to manipulate, e.g., push it forward, pull it backward, push it up or down, to control the cluster 112.

While, it is described in conjunction with FIG. 2 that the AVN input unit 111c, the cluster input unit 112c, and the HUD input unit 113c are separately implemented, it is possible that the AVN input unit 111c may incorporate the function of the cluster input unit 112c or HUD input unit 113c, that the cluster input unit 112c may incorporate the function of the AVN input unit 111c or HIJD input unit 113c, or that the HUD input unit 113c may incorporate the function of the AVN input unit 111c or cluster input unit 112c.

A speaker 143 for outputting sounds may be equipped in the vehicle 100. Accordingly, the vehicle 100 may output a sound through the speaker 143 required in performing audio, video, navigation, and other additional functions.

The speaker 143 may be controlled by a sounding unit 630. In some forms, the sounding unit 630 may output an alert sound or a sound effect indicating to the user or the driver that the angle of the side mirror 81, 82 or side camera 91, 92 has been changed.

Figure 4:
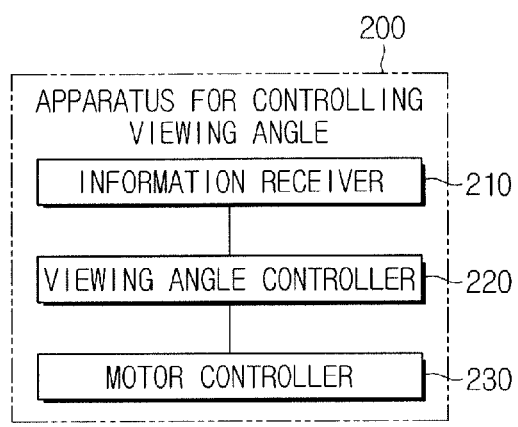
FIG. 4 is a block diagram of a module for an apparatus for controlling viewing angle.

FIG. 4 is a block diagram of a module for an apparatus for controlling viewing angle.

In FIG. 4, an apparatus 200 for controlling viewing angle may include an information receiver 210 for receiving information about a situation of the vehicle 100, a viewing angle controller 220 for determining whether it is a situation to change the angle of the side mirror or side camera of the vehicle 100, and determining the viewing angle to be changed, and a motor controller 230 for controlling the angle of the side mirror or side camera.

The information receiver 210 may receive information about a situation of the vehicle, information about a direction in which the vehicle is driven, and information about a lane (simply called lane information) in the direction in which the vehicle is driven (or simply called a driving direction of the vehicle).

The information about a situation of the vehicle 100 may include a current location of the vehicle 100, a gear level, a speed of the vehicle 100, whether the indicator lights are turned on or off, whether another car has been detected in the blind spot, and the like. For example, the current location and speed of the vehicle 100 may be calculated through the GPS module 410 or the navigation system 420. The gear level, whether the indicator lights are turned on or off, and whether another car has been detected in the blind spot may be received from corresponding modules or sensors included in the vehicle 100. The modules or sensors are only by way of example, and there are no limitations on which entities provide such information.

A driving direction of the vehicle 100 refers to a direction to which the front of the vehicle 100 is directed. The information about a driving direction of the vehicle 100 may also be received through the GPS module 410 or the navigation system 420. They are only by way of example, and there are no limitations on which entities provide such information.

The lane information in the driving direction of the vehicle 100 refers to information about a lane in the direction to which the front the vehicle 100 is directed. For example, if the vehicle 100 is moving in a straight lane without changing lanes, the lane information may be about a straight lane in parallel with the driving direction of the vehicle 100. Furthermore, the lane information of the driving direction of the vehicle 100 may be received through the image capturer 300 installed on the front of the vehicle 100. The image capturer 300 is only by way of example, and any device may be used to obtain the lane information. The image capturer 300 will be described in detail later in connection with FIG. 5A.

The viewing angle controller 220 may determine whether it is a situation to change the angle of the side mirror 81, 82 or side camera 91, 92 based on situational information collected by the information receiver 210, and then determine an angle between the driving direction of the vehicle 100 and a lane, the information of which is received by the information receiver 210.

The situational information collected by the information receiver 210 includes the information about a situation of the vehicle 100, information about a driving direction of the vehicle 100, and lane information of the driving direction of the vehicle 100.

A situation to change the angle of the side mirror 81, 82 or side camera 91, 92 may include a situation in which the driver 5 needs to turn his/her head to secure a rear view, e.g., at a point on the road joining another road, or when the vehicle has to change lanes at a low speed. It may also include a situation in which the driver 5 has to move his/her body to secure side and rear views to determine whether there is a following vehicle in the blind spot while changing lanes.

As a specific example, when the vehicle 100 is going nearer to a point on the road that joins an express way, the viewing angle controller 220 may determine at which point the angle of the side mirror 81, 82 or side camera 91, 92 needs to be changed. In other words, the viewing angle controller 220 may determine whether it is a situation for the driver 5 to secure side and rear views.

In another example, even if the BSD sensor detects that there is a vehicle in the blind spot while the vehicle 100 is being driven, it may not correspond to the situation to change the angle of the side mirror 81, 82 or side camera 91, 92. However, if there is also information about whether the indicator lights 121, 122 have been turned on by the driver 5 or whether the driver 5 has changed gears and slowed down the vehicle 100, the viewing angle controller 220 may determine that it is the situation to change the angle of the side mirror 81, 82 or side camera 91, 92.

In yet another example, after changing the angle of the side mirror 81, 82 or side camera 91, 92, the viewing angle controller 220 determines whether it is a situation to re-control the angle of the side mirror 81, 82 or side camera 91, 92.

Determination of the situation to change the angle of the side mirror 81, 82 or side camera 91, 92 is not limited to what are described above, but may be made by the viewing angle controller 220 comprehensively determining information about a situation of the vehicle received by the information receiver 210 based on set conditions.

After determining whether it is a situation to change the angle of the side mirror 81, 82 or side camera 91, 92, the viewing angle controller 220 may determine an angle between the driving direction of the vehicle 100 and a lane, the information of which is received by the information receiver 210. A detailed procedure of the viewing angle controller 220 determining the angle will be described later in connection with FIG. 8.

The motor controller 230 may serve to control a driving motor to control the angle of the side mirror 81, 82 or side camera 91, 92 upon reception of a signal from the viewing angle controller 220. With this, the motor controller 230 may control the angle of the side mirror 81, 82 or side camera. The motor controller 230 refers to a module for controlling an arrangement or device for shifting a device that detects side and rear views of the vehicle 100, and is not limited to the driving motor 500.

The information receiver 210, the viewing angle controller 220, and the motor controller 230 may be integrated on a system on chip (SOC) embedded in the apparatus 200 for controlling viewing angle, and may operate under the control of a processor.

Figure 5A:
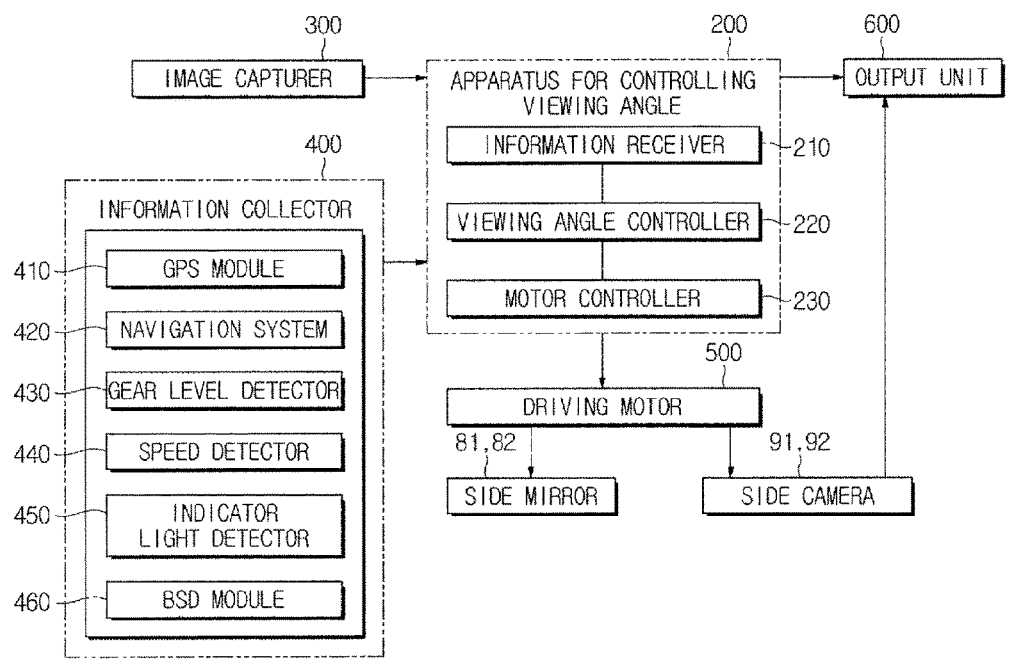
FIGS. 5A and 5B are block diagrams of a module of a vehicle that controls the angle of a side mirror or side camera.
Figure 5B:
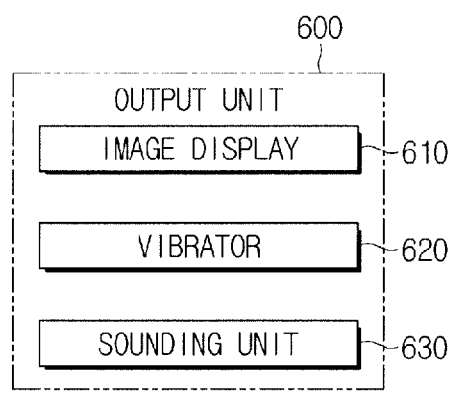

FIGS. 5A and 5B are block diagrams of a module of a vehicle for controlling the angle of a side mirror or side camera, according to an embodiment of the present disclosure.

Referring to FIG. 5A, the vehicle 100 may include an image capturer 300 for extracting lane information of the vehicle 100, an information collector 400 for collecting information about a situation of the vehicle 100 and information about a driving direction of the vehicle 100, a driving motor 500 for controlling the angle of the side mirror 81, 82 or side camera 91, 92, an output unit 600 for informing the driver 5 that the angle of the side mirror 81, 82 or side camera 91, 92 has been changed, and an apparatus 200 for controlling viewing angle by controlling the angle of the side mirror 81, 82 or side camera 91, 92 and controlling the driving motor 500 or output unit 600.

The image capturer 300 captures information about a lane in the direction to which the front of the vehicle 100 is directed. It may include at least one camera for capturing images within a predetermined range, and a module for extracting information about a lane from the image captured by the camera. The image capturer 300 may be located on the front face of the vehicle 100. This is only way of example, but the image capturer 300 may be installed in any position as long as the position allows recognition of lanes on the road.

The image capturer 300 may send the captured image to the apparatus 200 for controlling viewing angle, or extract lane information of the driving direction of the vehicle 100 and send the lane information to the apparatus 200.

The information collector 400 may collect information about a situation of the vehicle 100 and information about a driving direction of the vehicle 100. The information about a situation of the vehicle 100 may include a current location of the vehicle 100, a gear level, a speed of the vehicle 100, whether the indicator lights have been turned on or off, whether another car has been detected in the blind spot, and the like.

For this, the information collector 400 may include a Global Positioning System (GPS) module 410, a navigation system 420, a gear level detector 430, a speed detector 440, an indicator light detector 450, a BSD module 460, and the like. The module or device of the information collector 400 may be any device without limitations, as long as they are able to collect information about a situation of the vehicle 100.

The GPS module 410 is a means that may measure a current location of the vehicle 100 using at least one position measuring sensor (not shown). The position measuring sensor may include, but not exclusively, a GPS for measuring the position with satellites, and a Differential Global Positioning System (DGPS) that supplements the GPS and is capable of measuring the position with high precision.

The navigation system 420 may include a map database (not shown) and an apparatus for controlling viewing angle for navigation (not shown).

The map database may store map data. The map data includes various information for representing roads, buildings, and other things to represent the map. In addition, the map data may include information about a Point of Interest (POI).

The map data includes environmental information about the road in the map. The environmental information about the road refers to information relating to driving conditions of the road. Especially, the environmental information about the road may include information indicating that the road is going to enter an express way, information about a situation to change lanes, or information about a point at which two roads join.

The map database may be implemented in at least one type of flash memory, hard disk, multimedia card micro type memory, card type memory (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. However, the map database is not limited thereto, but may be implemented in any other form known in the art.

A navigation controller may calculate a route to a destination using the map data stored in the map database, and control operation of various functions of the navigation system. In some forms, the navigation controller may provide information required to measure a distance from the current location of the vehicle to the point at which two roads join.

The gear level detector 430 serves to detect a current gear level of the vehicle 100 and send the information about the current gear level to the apparatus 200 for controlling viewing angle.

The speed detector 440 serves to send information about a current speed of the vehicle 100 to the apparatus 200.

The indicator light detector 450 may serve to send the apparatus 200 information about when the driver 5 controls gears to flicker the indicator light 121, 122, or information about a situation when the indicator light 121, 122 is turned on or off.

The BSD module 460 may serve to send a detection result of the BSD sensor to the apparatus 200. Especially, the BSD module 460 may include a Charge-Coupled Device (CCD) camera for capturing the blind spot of the vehicle 100, through which a location and speed of a vehicle in the blind spot may be figured out. The BSD module 460 may send an image captured by the CCD camera to the apparatus 200.

What is shown in this Figure corresponds to the apparatus 200 of FIG. 4 embedded in the vehicle 100. The apparatus 200 for controlling viewing angle may include an information receiver 210 for receiving information about a situation of the vehicle 100, a viewing angle controller 220 for determining whether it is a situation to change the angle of the side mirror or side camera of the vehicle, and then determine the viewing angle, and a motor controller 230 for controlling the angle of the side mirror or side camera.

The apparatus 200 may control general operation of the devices contained in the vehicle 100, and control overall operation of the image capturer 300, information collector 400, driving motor 500, and output unit 600.

The apparatus 200 may be incorporated in an SOC in the vehicle 100, and may operate under the control of a processor. The apparatus 200 has already been described in connection with FIG. 4, so the detailed description of the apparatus 200 will be omitted herein.

The driving motor 500 is a motor to control the angle of the side mirror 81, 82 or side camera 91, 92. The driving motor 500 is driven under the control of the apparatus 200, and may be controlled by the motor controller 230.

The output unit 600 is a device to inform the driver 5 that the angle of the side mirror 81, 82 or side camera 91, 92 has been changed. The output unit 600 may also serve to show an image captured by the side camera 91, 92 at the changed angle.

Referring to FIG. 5B, the output unit 600 may include an image display 610 that displays an image captured by the side camera 91, 92, or an alert screen that informs the driver 5 that the angle of the side mirror 81, 82 or side camera 91, 92 has been changed, a vibrator 620 that makes e.g., the steering wheel 12 to vibrate to inform the driver 5 that the angle of the side mirror 81, 82 or side camera 91, 92 has been changed, and a sounding unit 630 that outputs an alert sound to inform the driver 5 that the angle of the side mirror 81, 82 or side camera 91, 92 has been changed.

The image display 610 may be coupled with the side camera 91 for outputting an image of a side and rear view of the vehicle 100, which is captured by the side camera 91, 92.

When the angle of the side camera 91, 92 is changed under the control of the apparatus 200, the image display 610 may display an image of the side and rear view of the vehicle 100 captured by the side camera 91, 92 at the changed angle.

The image display 610 may output an image captured by the side camera 91, 92 into the AVN display 111b, the cluster display 112b, and the display area 31 on the front glass 30 of the HUD module, as shown in FIG. 2. These are only by way of example, and a separate device may be installed to output the image captured by the side camera 91, 92.

Furthermore, the image display 610 may output an alert screen or screen indicating to the driver 5 that the angle of the side mirror 81, 82 or side camera 91, 92 has been changed.

For example, if the side mirror 81, 82 changes the angle under the control of the apparatus 200, the image display 610 may output an alert screen for the driver 5 to recognize the change in angle, or may output a screen to lead the driver 5 to check how much the angle of the side mirror 81, 82 has been changed.

The vibrator 620 makes vibration to inform the driver 5 that the angle of the side mirror 81, 82 or side camera 91, 92 has been changed.

For example, the vibrator 620 may be coupled with the steering wheel 12 and vibrate the steering wheel 12 to warn the driver 5 that the angle of the side mirror 81, 82 or side camera 91, 92 has been changed.

In some forms, the vibrator 620 may be coupled with any internal component of the vehicle 100 as long as the internal component may vibrate under the control of the vibrator 620 to let the driver 5 know that the angle of the side mirror 81, 82 or side camera 91, 92 has been changed.

The sounding unit 630 serves to output a warning sound to inform the driver 5 that the angle of the side mirror 81, 82 or side camera 91, 92 has been changed. With this, the driver 5 may recognize that the angle of the side mirror 81, 82 or side camera has been changed.

For example, the speaker 143 as shown in FIG. 2 may output a warning sound set in advance under the control of the sounding unit 630, or a sound to make the driver 5 recognize that the angle of the side mirror 81, 82 has been changed. These are only by way of example, and it is also possible to output such sound through any other device.

The side mirror 81, 82 and side camera 91, 92 will now be described in more detail in connection with FIGS. 6 and 7.

FIG. 6 shows a side mirror equipped with a side camera, which is mounted on a vehicle.

The left side mirror 81 is attached onto the main body 1 of the vehicle 100. The angle of the left side mirror 81 may be adjusted under the control of the motor controller 230. For example, the left side mirror 81 may be controlled to tilt forward or backward with respect to the vehicle 100.

The angle of the side camera 91 may also be adjusted under the control of the motor controller 230. For example, the side camera 91 may be controlled to tilt in the lateral direction, i.e., in the left/right direction with respect to the vehicle 100. This is only by way of example, and there are no limitations on the tilting directions of the angle in embodiments of the present disclosure.

Forms of the present disclosure are characterized by controlling the angle of the side mirror 81, 82 or side camera 91, 92 to show areas behind and to the sides of the vehicle 100. Accordingly, as shown in FIG. 6, forms of the present disclosure may also be applied to a vehicle 100 having the left side mirror 81 combined with the left side camera 91, and may include at least one device for monitoring side and rear views of the vehicle. In the case that the angle of the left side mirror 81 is controlled in accordance with forms of the present disclosure, the left side camera 91 may also be controlled together with the left side mirror 81, or separately from the left side mirror 81 to detect the blind spot.

FIG. 7 shows a vehicle equipped with a side camera.

In FIG. 7, the side camera 91 may be installed on the door 71 of the vehicle 100 to detect a situation behind and to the side of the vehicle 100. The vehicle of FIG. 7 is only equipped with side cameras 91, 92 without side mirrors 81, 82. The side cameras 91, 92 may replace the side mirrors 81, 82 to show the driver 5 an area behind and to the side of the vehicle 100.

In FIG. 7, the left side camera 91 is combined onto the left door 71 of the vehicle 100. This is only by way of example, and there are no limitations on where to place the side camera 91 in forms of the present disclosure. That is, the side cameras may be located in any positions including the positions where the side mirrors 81, 82 would be located, as long as the position allows the side cameras to detect situations behind and to the side of the vehicle 100.

If the angle of the side camera 91 is controlled, the side camera 91 may be tilted in the lateral direction, i.e., the left/right direction of the vehicle 100. This is only by way of example, and there are no limitations on the tilting directions of the angle in embodiments of the present disclosure.

Turning back to FIGS. 5A and 5B, a module of the vehicle 100 to control the angle of the side mirror 81, 82 or side camera 91, 92 may include other arrangements or modules in addition to the image capturer 300, information collector 400, driving motor 500, output unit 600, and the apparatus 200 for controlling viewing angle that controls them, and may operate under control of a processor.

Figure 8A:
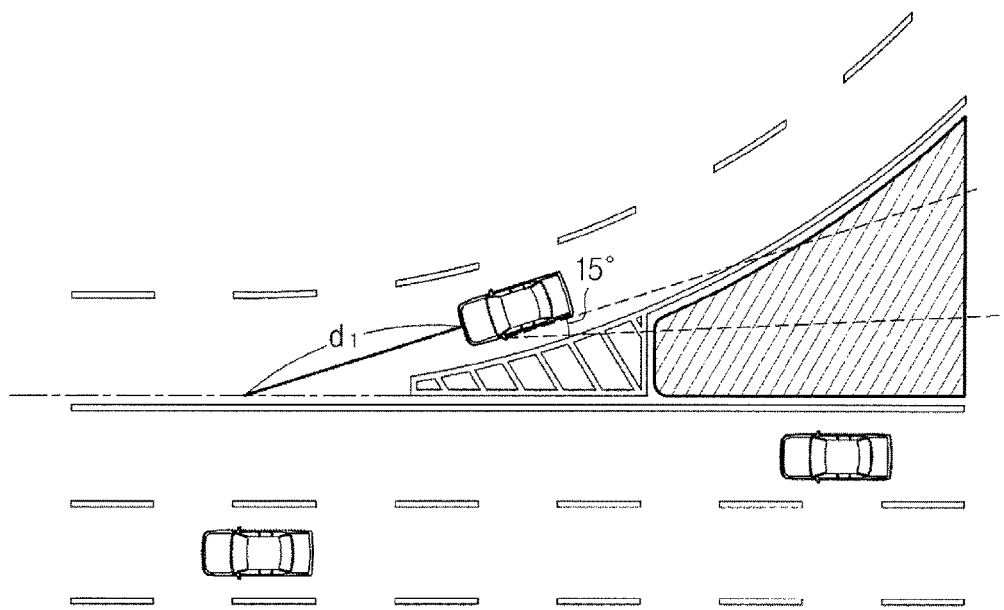
FIGS. 8A and 8B show instances where a vehicle changes the angle of a side mirror at a point where a road joins another road.
Figure 8B:
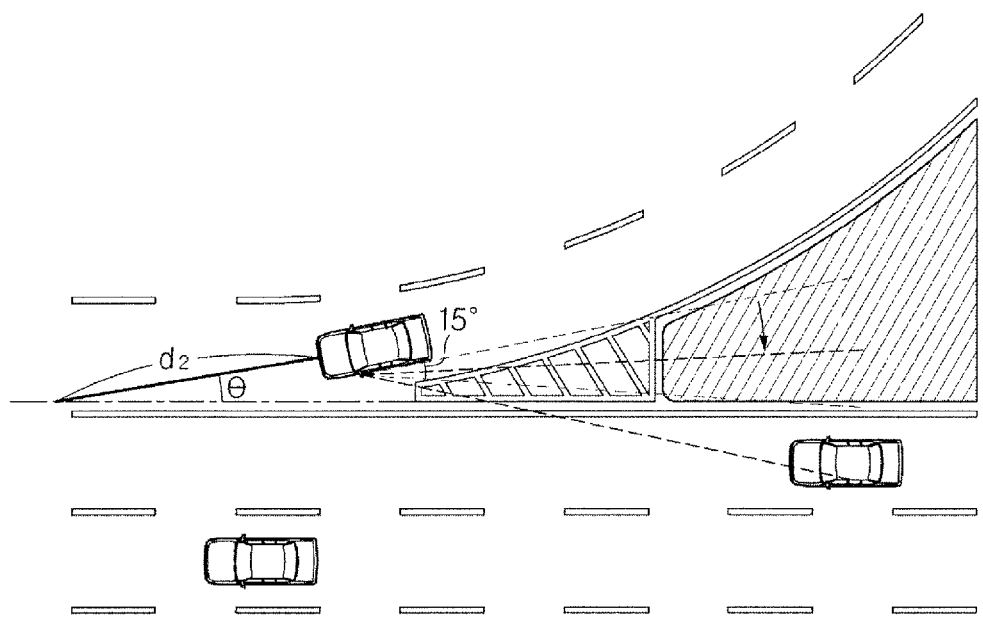

FIGS. 8A and 8B show instances where a vehicle changes the angle of side mirrors at a point where a road joins another road.

Referring to FIG. 8A, the vehicle 100 is approaching a point where two roads join. The apparatus 200 for controlling viewing angle receives information about a situation of the vehicle 100 through the GPS module 410 or navigation system 420 of the information collector 400.

The apparatus 200 determines whether it is a situation to change the angle of the left side mirror 81 based on the received information about a situation of the vehicle 100.

For example, the apparatus 200 may determine a virtual distance d1 from the current location of the vehicle 100 to the point where two roads join. The apparatus 200 may determine whether the angle of the left side mirror 81 needs to be changed based on the distance d1 between the current location of the vehicle 100 and the point where two roads join.

Specifically, assume that the navigation system 420 stores information indicating that the angle of a side mirror needs to be changed at a particular point where two roads join. If the apparatus 200 determines that the vehicle 100 is currently approaching to the particular point, it may determine whether it is a situation to change the angle of the left side mirror 81 based on the determined virtual distance d1.

In the case of FIG. 8A, the apparatus 200 determines the distance d1 from the current location of the vehicle 100 to the point where two roads join based on information sent from the information collector 400, and determines that a condition to change the angle of the left side mirror 81 is not still met, thus not controlling the driving motor 500.

While the vehicle 100 is approaching the point where two roads join, the apparatus 200 may continue to determine whether a field of view of the point where two roads join is secured based on the distance d1.

Referring to FIG. 8B, it is seen that the vehicle 100 is approaching nearer to the point where two roads join.

The apparatus 200 for controlling viewing angle may receive information about a situation of the vehicle 100 through the GPS module 410 or navigation system 420 of the information collector 400, and determine a distance d2 to the point where two roads join.

Based on the distance d2 and the stored information, the apparatus 200 may determine that the angle of the left side mirror 81 needs to be changed at the point where two roads join.

In the case the apparatus 200 determines that the angle of the left side mirror 81 needs to be changed based on the information about a situation of the vehicle 100 received from the information collector 400, the apparatus 200 may change the angle of the left side mirror 81 to an extent to which the field of view of a lane at the point where two roads join is secured.

Specifically, the angle to be changed by the apparatus 200 may be an angle θ between a straight line in the direction in which the vehicle is driven, the information of which is collected by the information collector 400, and a lane into which the vehicle 100 is going to enter, which is captured by the image capturer 300.

In this case, the apparatus 200 may change the angle of the left side mirror 81 of the vehicle 100 based on the determined angle. In other words, the apparatus 200 may control the driving motor 500 to change the angle of the left side mirror 81 as much as the determined angle θ.

Once the apparatus 200 has changed the angle of the left side mirror 81, it controls the output unit 600 to output an alert sound or image for the driver 5 to recognize that the angle of the left side mirror 81 has changed. Accordingly, the driver 5 may check the area behind and to the side of the vehicle 100 with the left side mirror 81 with respect to the lane at the point where two roads join, without need to move his/her body.

The instances illustrated in FIGS. 8A and 8B are only by way of example, and the angle of the side mirror 81, 82 may be controlled or changed differently in any other instances.

Figure 9:
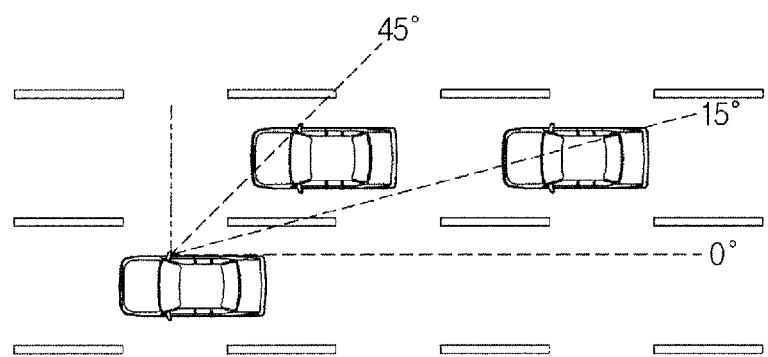
FIG. 9 shows an instance where the angle of a side mirror is changed if a Blind Spot Detection (BSD) sensor detects a vehicle in the blind spot.

FIG. 9 shows an instance where the angle of a side mirror is changed if a BSD sensor detects a vehicle in the blind spot.

Referring to FIG. 9, while the driver 5 is driving the vehicle 100 on a straight road, the driver 5 may find a vehicle in an area between 0 to 15 degrees through the right side mirror 82. In this case, an area between 15 to 45 degrees corresponds to a blind spot from the perspective of the driver 5, and any vehicle in this area is hardly recognized by the driver 5 through the right side mirror 82.

Referring to FIG. 9, a situation is assumed in which the driver 5 has turned on right indicator light 122 to change lanes while driving the vehicle 100 on a straight road. In this case, the BSD sensor may detect a presence of a vehicle in the blind spot between 15 to 45 degrees.

The apparatus 200 for controlling viewing angle may receive information about a situation of the vehicle 100 through the indicator light detector 450 and BSD detector 460. The information of a situational includes information indicating that the vehicle 100 will be changing lanes to the right and information indicating that a vehicle exists in the blind spot.

The apparatus 200 may have stored a situation to control the right side mirror 82 if information indicating that the right indicator light 122 has been turned on and that steering wheel is being manipulated together with the information indicating that a vehicle has been detected by the BSD sensor are received.

Based on the stored situation, the apparatus 200 may determine whether it is a situation for the vehicle 100 to change the right side mirror 82. If the current situation of the vehicle 100 corresponds to the stored situation, the apparatus 200 may control the driving motor 500 such that a view of the blind spot may be secured for the driver 5.

The driving motor 500 changes the angle of the right side mirror 82 to an angle at which the view of the blind spot is secured. Furthermore, the apparatus 200 may control the output unit 600 to output an alert sound or image to inform the driver 5 that the angle of the right side mirror 82 has been changed.

Accordingly, the driver 5 may secure the view of the right blind spot of the vehicle 100 without the need to move his/her body.

The instance illustrated in FIG. 9 is only by way of example, and the side mirror may be replaced by the side camera 91, 92 in various forms of the present disclosure.

Figure 10:
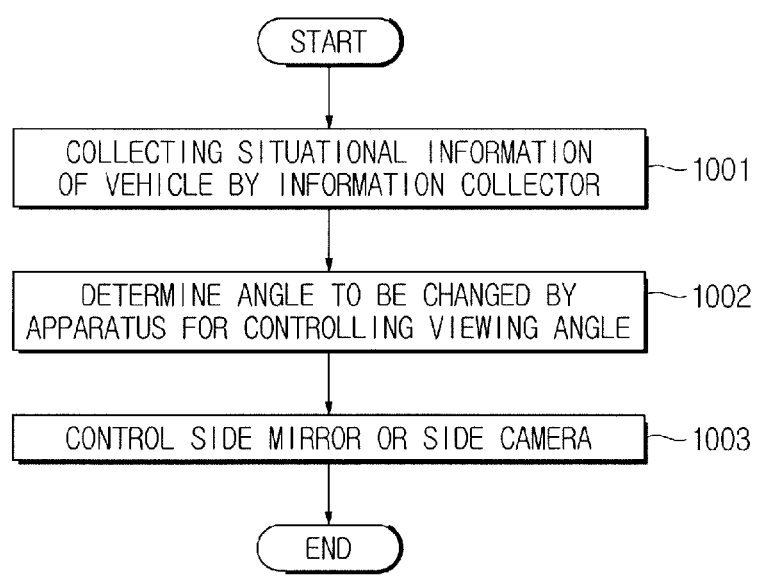
FIG. 10 is a flowchart illustrating operation of a vehicle including an apparatus for controlling viewing angle.

FIG. 10 is a flowchart illustrating operation of a vehicle including an apparatus for controlling viewing angle.

Referring to FIG. 10, the information collector 400 collects information about a situation of the vehicle 100 and information about a driving direction of the vehicle 100, in operation 1001.

There may be various information about a situation of the vehicle and information about a driving direction of the vehicle, which may be collected by the GPS module 410, navigation system 420, gear level detector 430, speed detector 440, indicator light detector 450, BSD module 460, and/or the like.

The apparatus 200 determines how much the angle of the side mirror 81, 82 or side camera 91, 92 is to be changed, in operation 1002.

Operation or procedures of changing the angle, which is performed by the apparatus 200 for controlling viewing angle, will be described in detail in connection with FIG. 11.

After determination of the angle to be changed, the apparatus 200 controls the side mirror 81, 82 or side camera 91, 92 to change the angle, in operation 1003.

The apparatus 200 may control the driving motor 500 or other device than the driving motor 500 to change the angle of the side mirror or side camera.

Figure 11:
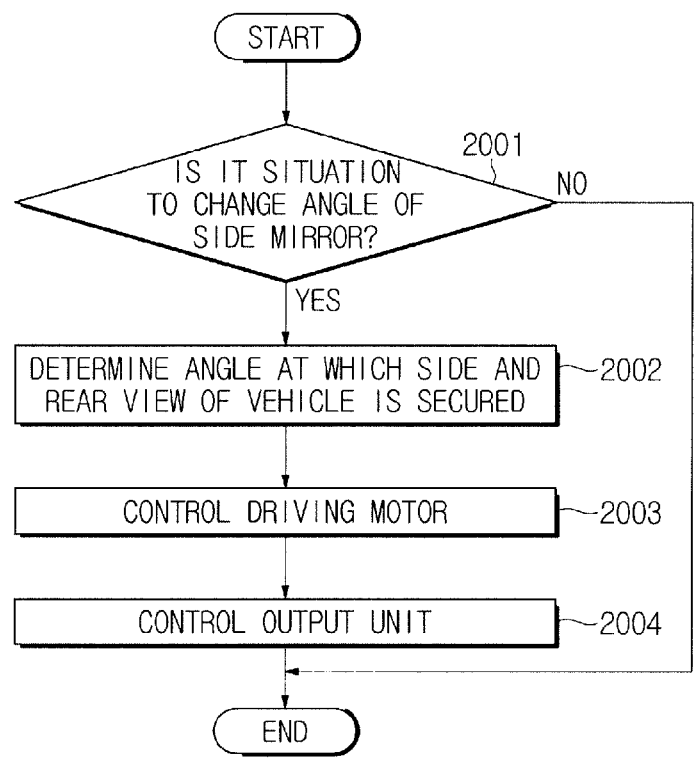
FIG. 11 is a flowchart illustrating a procedure of controlling a side mirror, which is performed by an apparatus for controlling viewing angle.

FIG. 11 is a flowchart illustrating a procedure of controlling a side mirror, which is performed by an apparatus for controlling viewing angle.

Referring to FIG. 11, the apparatus 200 for controlling viewing angle determines whether it is a situation to change the angle of the side mirror 81, 82, in operation 2001.

Specifically, the apparatus 200 determines whether it is a situation to change the angle of the side mirror 81, 82 or side camera 91, 92 of the vehicle 100 based on the information about a situation of the vehicle and the information about a driving direction of the vehicle 100, which are collected by the information collector 400.

If it is not the situation to change the angle of the side mirror 81, 82 or side camera 91, 92, the apparatus 200 does not control the angle of the side mirror 81, 82 or side camera 91, 92.

Otherwise, if it the situation to change the angle of the side mirror 81, 82, the apparatus 200 determines an angle at which the driver 5 may secure a side and rear view, in operation 2002.

A procedure of determining the angle may vary depending on set conditions.

For example, the apparatus 200 may determine the angle at which the view of a point where two roads join is secured based on an angle between a virtual straight line in the driving direction of the vehicle 100, the information of which is collected by the information collector 400, and a lane into which the vehicle 100 is going to enter, which is captured by the image capturer 300. In another example, the apparatus 200 may determine the angle at which the view of the blind spot may be secured when the vehicle 100 is changing lanes.

After determination of the angle, the apparatus 200 may control the driving motor 500 to change the side mirror 81, 82 based on the angle, in operation 2003.

After the angle of the side mirror 81, 82 is changed using the driving motor 500, the apparatus 200 controls the output unit 600 to output an warning sound or screen to inform the driver 5 that the angle of the side mirror 81, 82 has been changed, in operation 2004.

Figure 12:
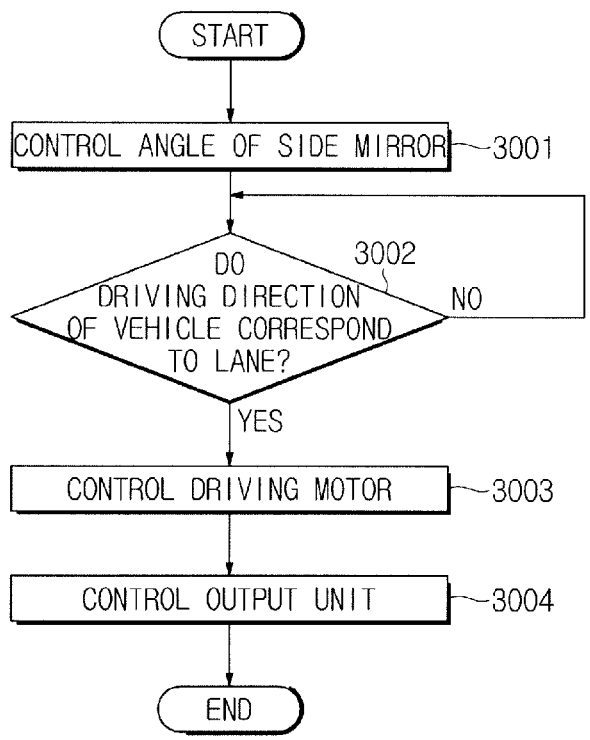
FIG. 12 is a flowchart illustrating a procedure of re-controlling a side mirror after the angle of the side mirror is changed, which is performed by an apparatus for controlling viewing angle.

FIG. 12 is a flowchart illustrating a procedure of re-controlling a side mirror after the angle of the side mirror is changed, which is performed by an apparatus for controlling viewing angle.

Referring to FIG. 12, the angle of the side mirror 81, 82 is controlled by the apparatus 200 for controlling viewing angle, in operation 3001. That is, the angle of the side mirror 81, 82 is controlled.

Next, the apparatus 200 determines whether the driving direction of the vehicle 100, the information of which is collected by the information collector 400, corresponds to a direction of a lane captured by the image capturer 300, in operation 3002.

For example, if the vehicle 100 changes lanes after changing the angle of the side mirror 81, 82 to detect a car in the blind spot, then the side mirror 81, 82 of the vehicle 100 needs to be changed back into the position before it was controlled.

Specifically, the vehicle 100 is driven along a lane after changing into the lane. At this time, the driving direction of the vehicle 100, the information of which is collected by the information collector 400, corresponds to a direction of the lane captured by the image capturer 300, and the apparatus 200 may determine that it is a situation to re-control the side mirror 81, 82 which is positioned at a changed angle.

If the driving direction of the vehicle 100, the information of which is collected by the information collector 400, does not correspond to the direction of the lane captured by the image capturer 300, the apparatus 200 does not control the side mirror 81, 82.

If the driving direction of the vehicle 100, the information of which is collected by the information collector 400, correspond to the direction of the lane captured by the image capturer 300, the apparatus 200 controls the driving motor 500, in operation 3003.

The apparatus 200 may control the driving motor 500 to re-control the side mirror 81, 82 to be in the previous position before the angle was changed, or to be positioned at another set angle.

After re-controlling the angle of the side mirror 81, 82, the apparatus 200 informs the driver 5 that the angle of the side mirror 81, 82 has been re-controlled. That is, the apparatus 200 controls the output unit 600 to indicate that the angle has been re-controlled, in operation 3004.

The driver 5 may then recognize that the angle of the side mirror 81, 82 has been re-controlled.

Figure 13:
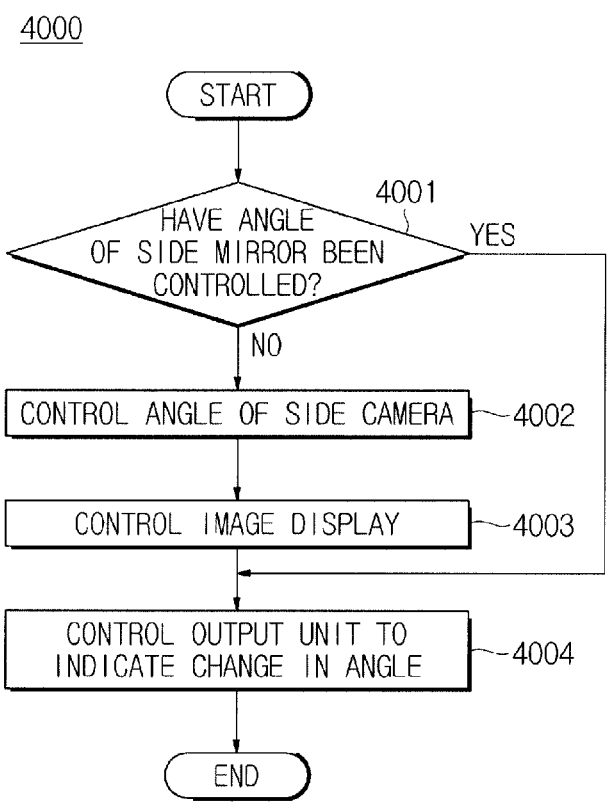
FIG. 13 is a flowchart illustrating operation of controlling a vehicle having side mirrors combined with side cameras.

FIG. 13 is a flowchart illustrating operation of controlling a vehicle having side mirrors combined with side cameras.

In an embodiment of the present disclosure, the apparatus 200 for controlling viewing angle may be applied to vehicles having side mirrors 81, 82 only installed thereon, vehicles having side cameras 91, 92 only installed thereon, or vehicles having both side mirrors and side cameras installed thereon. In FIG. 13, an example of a flowchart illustrating operation of controlling a vehicle having side mirrors combined with side cameras is shown.

Referring to FIG. 13, the apparatus 200 for controlling viewing angle determines whether it has controlled the angle of the side mirror 81, 82, in operation 4001.

Once the apparatus 200 has controlled the angle of the side mirror 81, 82, the apparatus 200 controls the output unit 600 to produce a warning sound or display an image to indicate the change in angle of the side mirror 81, 82. Since the side mirrors 81, 82 are configured for the driver 5 to see a side and rear view of the vehicle with his/her eyes, the image display 610 for displaying a separate screen is not required to be controlled.

The apparatus 200 determines whether the angle of the side camera 91, 92 has been controlled, in operation 4002, unless the angle of the side mirror 81, 82 has not been controlled.

If the angle of the side camera 91, 92 has not been controlled, the apparatus 200 does not control the output unit 600. Otherwise, if the angle of the side camera 91, 92 has been controlled, the apparatus 200 controls the side camera 91, 92.

The apparatus 200 controls the image display 610 to display a side and rear view image captured by the side camera 91, 92 at the changed angle, in operation 4003.

The driver 5 may then check the view of areas behind and to the side of the vehicle 100 without moving his/her body whenever required.

The apparatus 200 controls the output unit 600 to produce a warning sound or image to indicate that the angle of the side camera 91, 92 has been changed, in operation 4004.

What is shown in FIG. 13 is merely an example of controlling a vehicle having side mirrors 81, 82 combined with side cameras 91, 92, and the apparatus 200 may control the vehicle in different sequences or in different manners.

Figure 14:
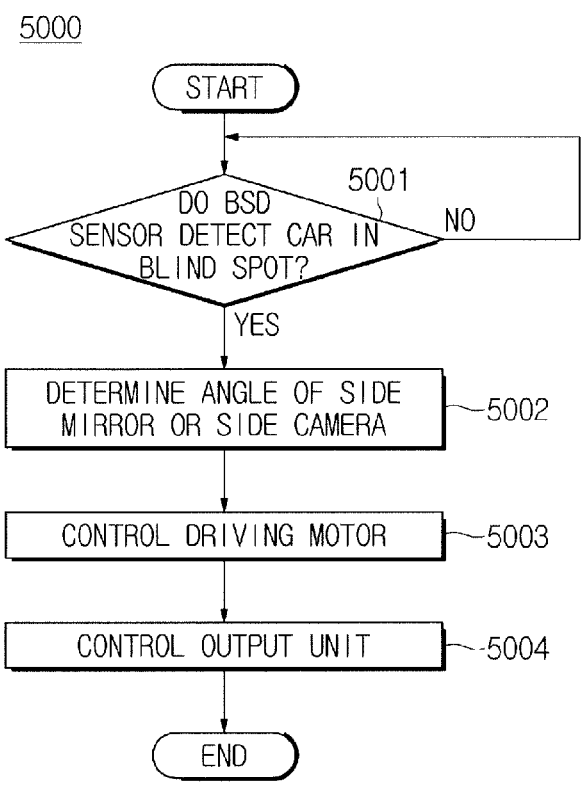
FIG. 14 is a flowchart illustrating operation of controlling the angle of a side mirror or side camera to secure a view of a blind spot.

FIG. 14 is a flowchart illustrating operation of controlling the angle of a side mirror or side camera to secure a view of a blind spot.

The BSD sensor determines whether a vehicle is detected in the blind spot, in operation 5001.

Specifically, if there is also information about whether the indicator lights 121, 122 have been turned on by the driver 5 or whether the driver 5 has changed gears and slowed down the vehicle 100, the apparatus 200 may determine that it is the situation to change the angle of the side mirror 81, 82 or side camera 91, 92.

In this case, the apparatus 200 may determine that it is the situation to change lanes, and then receive information indicating that a vehicle exists in the blind spot from the BSD module 460.

If a vehicle is detected behind and to the side of the vehicle 100 by the BSD sensor, the apparatus 200 determines an angle of the side mirror 81, 82 or side camera 91, 92 at which a view of the blind spot may be secured, in operation 5002.

After determination of the angle, the apparatus 200 controls the driving motor 500, in operation 5003. The driving motor 500 controls the angle of the side mirror 81, 82 or side camera 91, 92.

The apparatus 200 controls the output unit 600 to indicate that a vehicle has been detected, in operation 5004.

Specifically, the output unit 600 may produce a warning sound or image to inform the driver 6 that the angle of the side mirror 81, 82 or side camera 91, 92 has been changed. Furthermore, the output unit 600 may provide a warning or image to indicate that there is a vehicle in the blind spot, and may display an image captured by the side camera 91, 92 in controlling the angle of the side camera 91, 92.

According to forms of an apparatus and method for controlling a viewing angle for vehicles, and a vehicle including the apparatus, movements of a following vehicle may be easily determined and driving convenience and stability may increase without the need for the driver to look back, by controlling the angle of a side mirror or side camera according to a condition of the vehicle.

Several forms have been described, but a person of ordinary skill in the art will understand and appreciate that various modifications can be made without departing the scope of the present disclosure. Thus, it will be apparent to those ordinary skilled in the art that the disclosure is not limited to the forms described, which have been provided only for illustrative purposes.

What is claimed is:

1. An apparatus for controlling a viewing angle for a vehicle, the apparatus comprising:
    an information receiver configured to receive vehicle component information, driving direction information including a driving direction of the vehicle, and lane information including an orientation of a lane the vehicle is traveling on;
    a motor controller configured to control an angle of a side mirror or a side camera attached to the side mirror, wherein the side camera is configured to capture a side view and a rear view of the vehicle;
    a viewing angle controller configured to:
        change an angle of the side mirror or the side camera by controlling movement of the side mirror or the side camera based on whether the vehicle component information is determined to include a vehicle state for changing the angle of the side mirror or the side camera; and
        change the angle of the side mirror or the side camera by controlling movement of the side mirror or the side camera based on whether the driving direction information and the lane information are determined to indicate the orientation of the lane the vehicle is traveling on is not in-line with the driving direction of the vehicle; and
    an output unit configured to inform a driver that an angle of the side mirror has been changed.

2. The apparatus of claim 1, wherein the viewing angle controller is configured to:
    determine a distance from a current location of the vehicle to an adjacent lane, based on the vehicle component information received by the information receiver.

3. The apparatus of claim 2, wherein the viewing angle controller is configured to:
    determine the angle between the driving direction of the vehicle and the adjacent lane, based on the distance.

4. The apparatus of claim 1, wherein the viewing angle controller is configured to control movement of the side mirror or the side camera to change the angle of the side mirror or side camera, if the lane information and the driving direction information correspond to a same lane.

5. A vehicle comprising:
    an information collector configured to collect vehicle component information and driving direction information including a driving direction of the vehicle;
    an image capturer mounted on the front of the vehicle, wherein the image capturer is configured to obtain lane information including an orientation of a lane the vehicle is traveling on;
    an apparatus configured to:
        change an angle of the side mirror or the side camera by controlling movement of the side mirror or the side camera based on whether the vehicle component information is determined to include a vehicle state for changing the angle of the side mirror or the side camera; and
        change the angle of the side mirror or the side camera by controlling movement of the side mirror or the side camera based on whether the driving direction information and the lane information are determined to indicate the orientation of the lane the vehicle is traveling on is not in-line with the driving direction of the vehicle; and
    an output unit configured to inform a driver that an angle of the side mirror has been changed.

6. The vehicle of claim 5, wherein the apparatus is further configured to:
    determine a distance from a current location of the vehicle to an adjacent lane, based on the vehicle component information collected by the information collector.

7. The vehicle of claim 6, wherein the apparatus is further configured to:
    determine the angle between the driving direction of the vehicle and the adjacent lane, based on the distance.

8. The vehicle of claim 5, wherein the apparatus is further configured to:
    control movement of the side mirror or the side camera to change the angle of the side mirror, if the lane information captured by the image capturer and the driving direction information correspond to a same lane.

9. The vehicle of claim 5, wherein the information collector comprises at least one of a Global Positioning System (GPS) module, a navigation system, a gear level of the vehicle, a speed detector of the vehicle, a Blind Spot Detection (BSD) detector, or an indicator light detector.

10. The vehicle of claim 5, wherein the output unit comprises
at least one of an image display, a vibrator, and a sounding unit.

11. A method for controlling a viewing angle for a vehicle, the method comprising:
collecting, by an information receiver included in the vehicle, vehicle component information about a state of vehicle components included in the vehicle, and driving direction information including a driving direction of the vehicle;
obtaining, by an information receiver included in the vehicle, lane information including an orientation of a lane the vehicle is traveling on;
determining whether the vehicle component information includes a vehicle state for changing an angle of the side mirror or side camera;
controlling, by a viewing angle controller, movement of the side mirror or the side camera to change the angle of the side mirror or the side camera based on whether the vehicle component information is determined to include the vehicle state for changing the angle of the side mirror or side camera;
determining, by the viewing angle controller, an angle between the driving direction of the vehicle and the orientation of the lane the vehicle is traveling on based on the driving direction information and the lane information;
controlling, by a motor controller, movement of the side mirror or the side camera to change the angle of the side mirror or the side camera based on the determined angle; and
informing a driver that the angle of the side mirror or side camera has been changed.

12. The method of claim 11, wherein determining the angle between the driving direction of the vehicle and the orientation of the lane the vehicle is traveling on comprises:
determining a distance from a location of the vehicle to an adjacent lane based on the vehicle component situational information.

13. The method of claim 12, wherein determining the distance comprises:
determining an angle between the driving direction of the vehicle and the adjacent lane, based on the distance.

14. The method of claim 11, further comprising:
controlling movement of the side mirror or the side camera to change the angle of the side mirror or side camera, if the lane information and the driving direction information correspond to a same lane.

* * * * *